(12) United States Patent
Chang et al.

(10) Patent No.: US 8,875,222 B1
(45) Date of Patent: Oct. 28, 2014

(54) EFFICIENT XACML ACCESS CONTROL PROCESSING

(75) Inventors: Lei Chang, Beijing (CN); Jeroen Van Rotterdam, Berkeley, CA (US); David Choy, Los Altos, CA (US)

(73) Assignee: EMC Corporation, Hopkinton, MA (US)

( * ) Notice: Subject to any disclaimer, the term of this patent is extended or adjusted under 35 U.S.C. 154(b) by 268 days.

(21) Appl. No.: 13/174,719

(22) Filed: Jun. 30, 2011

(51) Int. Cl.
*H04L 9/00* (2006.01)

(52) U.S. Cl.
USPC .............................................. 726/1; 713/151

(58) Field of Classification Search
USPC .................................... 726/1–2, 27; 713/151
See application file for complete search history.

(56) References Cited

U.S. PATENT DOCUMENTS

| | | | |
|---|---|---|---|
| 2008/0263625 A1* | 10/2008 | Gomez et al. ...................... 726/1 |
| 2009/0198697 A1* | 8/2009 | Bilger et al. ...................... 707/9 |
| 2009/0288136 A1* | 11/2009 | Chang et al. ...................... 726/1 |
| 2009/0307742 A1* | 12/2009 | Forster .............................. 726/1 |
| 2010/0042973 A1* | 2/2010 | Anderson et al. ............. 717/120 |
| 2010/0257579 A1* | 10/2010 | Karjoth et al. ................... 726/1 |
| 2011/0246498 A1* | 10/2011 | Forster .......................... 707/769 |

\* cited by examiner

*Primary Examiner* — Matthew Smithers
(74) *Attorney, Agent, or Firm* — Barry N. Young

(57) ABSTRACT

A highly efficient access control system and method employing XACML standard based policies and rules provides high performance resource access control of information systems of large enterprises. The system and method extracts plain rules from the XACML policies, transforms the plain rules into atomic rules, and compresses and indexes the atomic rules for fast lookup and retrieval. Access requests are decomposed into atomic requests which are compressed using the same value mapping as the rules. Index keys derived from compressed atomic request triplets are used to look up applicable rules which are used to evaluate requests for access to information system resources.

20 Claims, 3 Drawing Sheets

EFFICIENT XACML ACCESS CONTROL PROCESSING

BACKGROUND

This invention relates generally to controlling access to resources, such as information, in an information system of an enterprise, and more particularly to controlling access to information using varied multi-conditional, multi-functional policies defined and expressed in accordance with the XACML standard and language.

An information system usually provides an access control facility that controls access to the information resources managed by the system. Such a facility manages a collection of access control policies that are created by resource owners or authorized administrators. When the system receives a request by a user for access to a protected information resource, all applicable access control policies in effect must be evaluated to determine whether the user's request should be permitted or denied. For a large information system, as of an enterprise, a major challenge is to perform this process efficiently, especially for a request that involves many resources such as a query that may examine or return hundreds of thousands, or more, protected resources, and for access policies that may be quite varied and multi-conditional. An access control facility based upon the known access control list (ACL) approach which controls access based upon user identifiers is ill-suited for such an application, as it is document centric and cannot easily handle different conditions.

The OASIS eXtensible Access Control Markup Language (XACML) affords a standardized representation for an access control policy and an access control decision request/response language. It enables externalization of decision calculation for access requests based on XACML policies, thereby allowing reuse of decision logic. The XACML v2.0 specification is available from OASIS (Organization for the Advancement of Structured Information Standards). The XACML policy language is highly expressive and extensible and can accommodate fine-grained access control making it highly advantageous for access control in an information management system requiring a varied, multi-conditional access policy. However, evaluation of XACML policies is time consuming. Because of XACML's generality and extensibility, a brute-force evaluation of XACML policies is highly inefficient, especially when a large number of resources are involved such as in the case of a query request. Since access control performance is critical in information systems, the advantages afforded by XACML's generality and extensibility are offset by the poor performance of known XACML policy evaluation approaches in large enterprises.

It is desirable to provide access control facilities comprising systems and methods that take advantage of the extensibility and generality of XACML while addressing the foregoing and other problems, by affording efficiently evaluation of XACML policies and high performance access control facilities based thereon. It is to these ends that the present invention is directed.

DESCRIPTION OF PREFERRED EMBODIMENTS

The invention is particularly well adapted for managing access to and actions permitted by large numbers of differently entitled subjects to information resources such as files or other documents stored in a large repository of an information system of an enterprise, and will be described in that context. As will be appreciated, however, this is illustrative of only one utility of the invention. In particular, it will become apparent that the invention is applicable more generally to security systems and methods for controlling access and actions by subjects to tangible as well as intangible resources, where the systems and methods involve large numbers of varied, multi-level, multi-conditional security policies which may be dynamic and must be evaluated quickly and efficiently.

Figure 1:
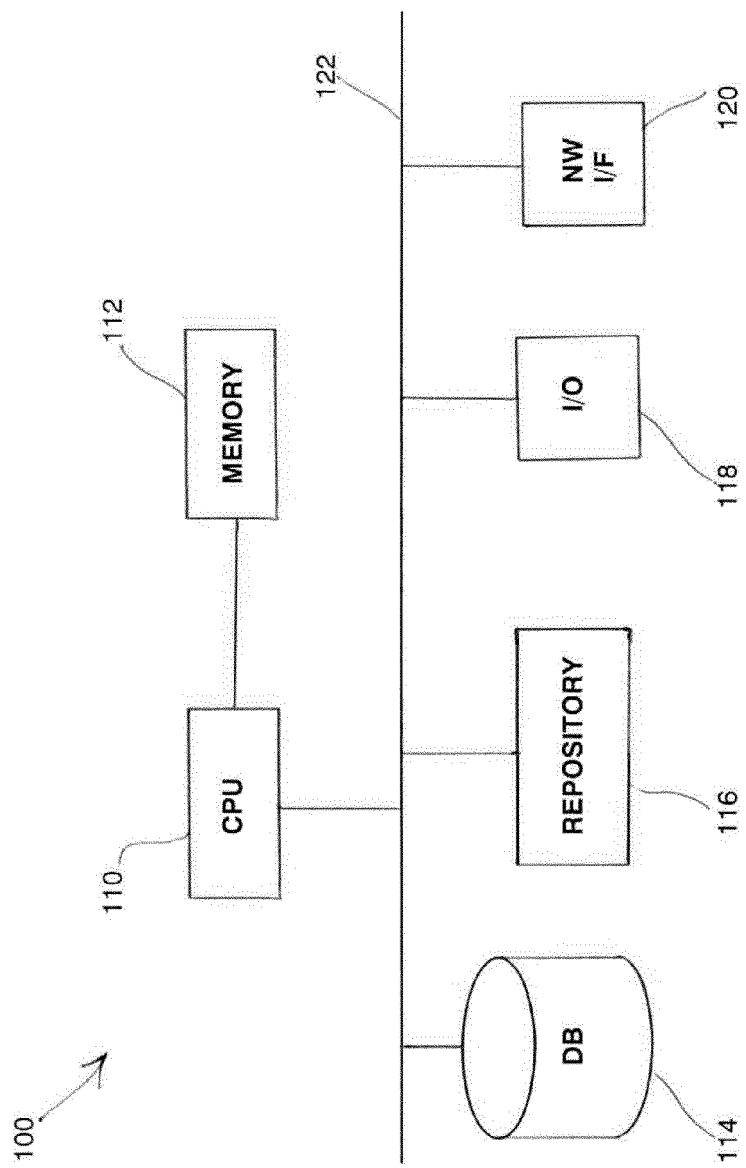
FIG. 1 is a block diagram that illustrates a system of the type with which the invention may be employed.

FIG. 1 illustrates the architecture of an embodiment of an information management system 100 of the type with which an access control system in accordance with the invention may be employed. The system 100 may include a CPU 110, such as a server, comprising one or more processors, and an associated memory 112 comprising non-transitory computer readable storage media embodying computer executable instructions (control programs) for controlling the operation of the CPU in accordance with the invention. The system 100 may further comprise a database 114 for storing access policies and rules defining access to system information resources, a repository 116 of system information resources such as files, documents, databases, etc., an input/output interface 118 for users and system administrators, and a network interface 120 for enabling communications between the computer system and client computers or other peer systems of the enterprise. Database 114, repository 116, input/output interface 118 and network interface 120 may be connected to CPU 110 in a well known manner by a bus 122.

Because of the high expressiveness and extensibility of the XACML standard and language, the access policies and rules employed by the invention for controlling access to resources are preferably XACML based. As previously indicated, traditional approaches to evaluating access requests governed by XACML policies and rules are very inefficient and time-consuming, especially when large numbers of policies and resources are involved. As will be described, a system and method in accordance with the invention avoids such inefficient traditional approaches, and instead affords high efficiency and high performance access control systems and methods for evaluating access requests based upon XACML policies and rules. Generally, as will be described, in accordance with the invention, plain rules are extracted from XACML policies and plain rules are transformed into atomic rules which are compressed and indexed. Upon receiving an access request, the access request is evaluated by decomposing the access request into atomic requests, and the atomic requests are used to derive index keys to search the indexed and compressed XACML atomic rules. This enables applicable rules to be quickly identified and evaluated to determine whether the access request should be permitted or denied.

Figure 2:
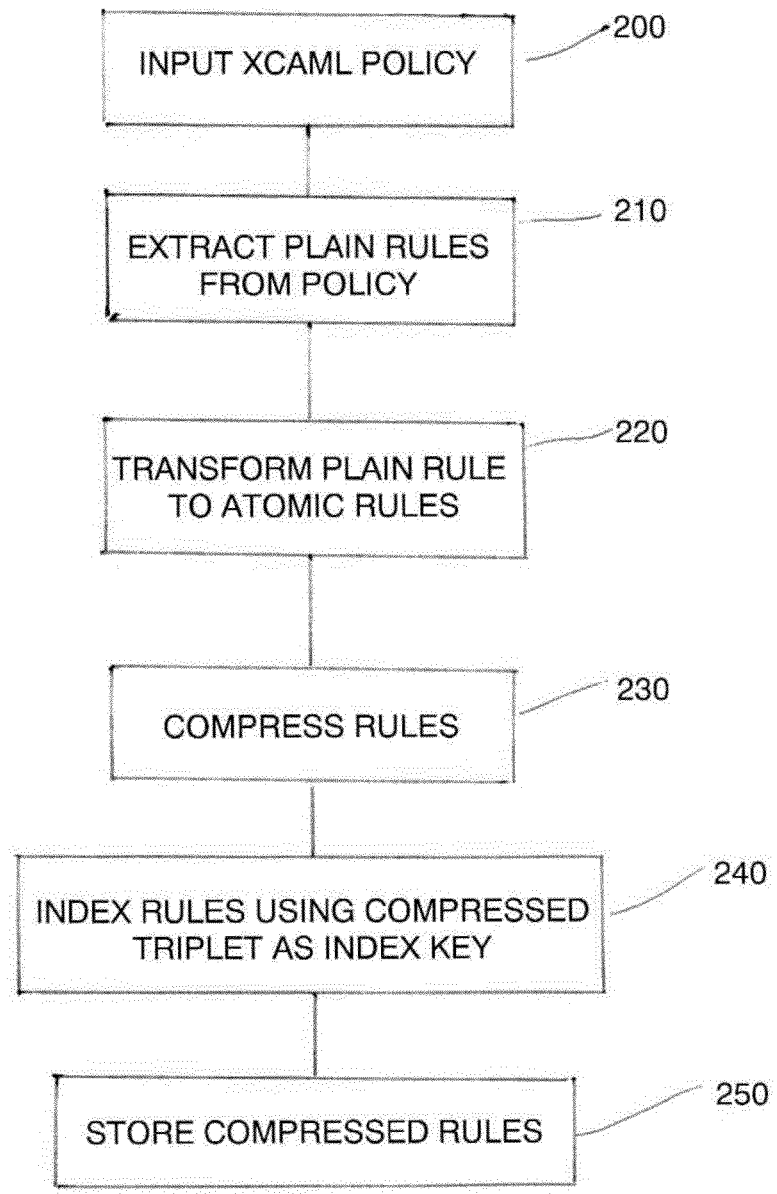
FIG. 2 illustrates a process in accordance with the invention for processing XACML policies to produce compressed indexed rules.

FIG. 2 is a flowchart of a preferred process in accordance with the invention for processing XACML policies to produce compressed and indexed rules. The process of FIG. 2 may be performed by the CPU 110 of the system 100 of FIG. 1 operating under the control of computer executable instructions stored on computer readable media in memory 112, for instance. Referring to FIG. 2, XACML policies are input at 200, and plain rules are extracted from the policies at 210. The plain rules are transformed into atomic rules at 220, compressed at 230, indexed at 240 using a compressed triplet of the rule as an index key, and stored at 250.

Access policies and rules involve three primary entities, a subject, an action and a resource, and their attributes, as well as conditions and attribute predicates. A subject requests permission to perform an action on a resource. A policy may be, for instance: "Any user (subject) with an e-mail name within the namespace xyz.com (attribute) is allowed to perform any action (action) on documents in the file: D:/Documents/Project_One Plan (resource)". If s, a, and r respectively represent a subject, an action and a resource, and S, A and R respectively represent a subject set, and action set and a resource set, a plain rule can be denoted by $$S \in S \wedge a \in A \wedge r \in R \wedge C \rightarrow d$$

where C is a condition, and d is a decision which may be either "PERMIT" or "DENY". The rule means that if subject, s, is in the subject set, S, and action, a, is in the action set, A, and resource, r, is in the resource set, R, and the condition C is satisfied, then the request: subject, s, performs action, a, on resource, r, is permitted if decision, d, is "PERMIT" or denied if d is "DENY". A condition, C, may be, e.g., "during office hours", and any entity s, a or r of the triplet <s, a, r> of a rule may be qualified by an attribute predicate, e.g., "subject is a member of the Project One group". Further, a subject, action, or resource may have many attributes. An attribute is identified by a pair <attribute identifier, attribute value>. If an entity, i.e., a subject, action or resource, in a plain rule has an attribute identifier "attrid" with value "attrvalue", then a request should carry the same attribute, attrid, and attribute value, attrvalue, to match the rule. An attribute value ANY means that the rule applies to any value for the corresponding entity of the triplet, subject to qualification by any attribute predicate.

An atomic rule has the form $s=s_1 \wedge a=a_1 \wedge r=r_1 \wedge C \rightarrow d$ and differs from a plain rule in that each entity of the triplet (s, a, r) takes a single value ($s_1, a_1, r_1$), in an atomic rule, whereas each entity belongs to a set (S, A, R) in a plain rule. A single value $s_1$, $a_1$, or $r_1$ may be a specific value for a subject, an action, or a resource respectively, or it may be the special value "ANY". After a plain rule is extracted at 210 from a policy, it may be transformed into a set of atomic rules at 220 by generating a triplet <s, a, r> for each said atomic rule $s=s_i \wedge a=a_i \wedge r=r_i \wedge C \rightarrow d$, where $s_i$, $a_i$, and $r_i$ are instances of attribute values of the entities s, a and r that are covered by the plain rule.

The plain representation of an XACML rule has many XML elements, and uses strings to represent entity identifiers. Storing string identifiers consumes a great deal of memory or disk space. In addition, key comparison of strings is not efficient for locating rules in an index. Thus, in accordance with the invention, the entity identifiers of rule triplets are preferably converted to more compact representations at 230 by mapping a string entity identifier to a short byte array, as by transforming the identifier to a numerical value using, for example, an MD5 hash. Two different identifiers may have the same transformed value. The conflict between identifiers may be resolved in the index design, as will be described.

After decomposing plain rules from XACML policies into atomic rules at 220 in FIG. 2, there may be a number of atomic rules with identical triplets. To save memory and disk space, the rules with the same triplets may also be compressed at 230. Compression may be as follows. Assuming that there are n atomic rules $s=s_1 \wedge a=a_1 \wedge r=r_1 \wedge C_1 \rightarrow d_1, \ldots, s=s_n \wedge a=a_n \wedge r=r_n \wedge C_n \rightarrow d_n$ with identical triplets, compression of the rules results in a single index entry <id($s_1$),id($a_1$),id($r_1$)>:<attr($s_1,a_1,r_1$),$C_1,d_1$>, ..., <attr($s_n,a_n,r_n$),$C_n,d_n$>. The id(e) function of an entity e may get the identity of the entity. The attr(s,a,r) function may get the attribute set of s, a and r. The head part of the compressed rule, <id($s_1$),id($a_1$),id($r_1$)>, comprises a compressed rule head triplet.

Preferably, each part (entity) of a triplet, as well as the decision value and each associated condition and attribute predicate are compressed into a compact identifier, such as a numeric value in the manner previously described. This compression is preferably "lossless" information-wise, meaning no information is lost and the compression is reversible to obtain the complete original information.

At 240, a rule index may be built to accelerate the lookup of rules when evaluating requests. Preferably, the index is stored in memory 112 of CPU 110 to facilitate fast lookup and retrieval of rules. The index may store a set of <key, count value> tuples, each of which corresponds to an index entry previously described. The key may be a byte array which is formed by concatenating the numericalized values of the fields of the triplet of a compressed rule head. Two compressed atomic rules may map to the same key. The count may be the number of atomic rules that map to the same key. The value field of the tuple is a list of compressed attribute predicates, conditions, and decisions previously described for an index entry.

The index may be updated using the compressed triplet as an index key when a XACML policy is created, modified, or deleted. If the atomic rules were derived from a newly created XACML policy, they can be added to the index. If the atomic rules were derived from a deleted XACML policy, their corresponding atomic rules can be removed from the index. If an XACML policy is modified, the index may be updated for the modified policy, as if the old policy was deleted and a new one created. When a new atomic rule is to be added to the index that has a key identical to the key of an existing entry in the index, the count of the existing entry only needs to be increased by one. Likewise, if an atomic rule corresponding to an index entry with a count of more than one is to be removed from the index, its count only needs to be decreased by one. Compressing values in this manner keeps the index small, which enhances its ability to remain stored in memory and speeds up key comparison during an index search.

At 250 in FIG. 2, the index constructed out of compressed atomic rules may be stored in a data structure, such as a B-tree or a hash table, in database 114 of system 100 (FIG. 1).

Figure 3:
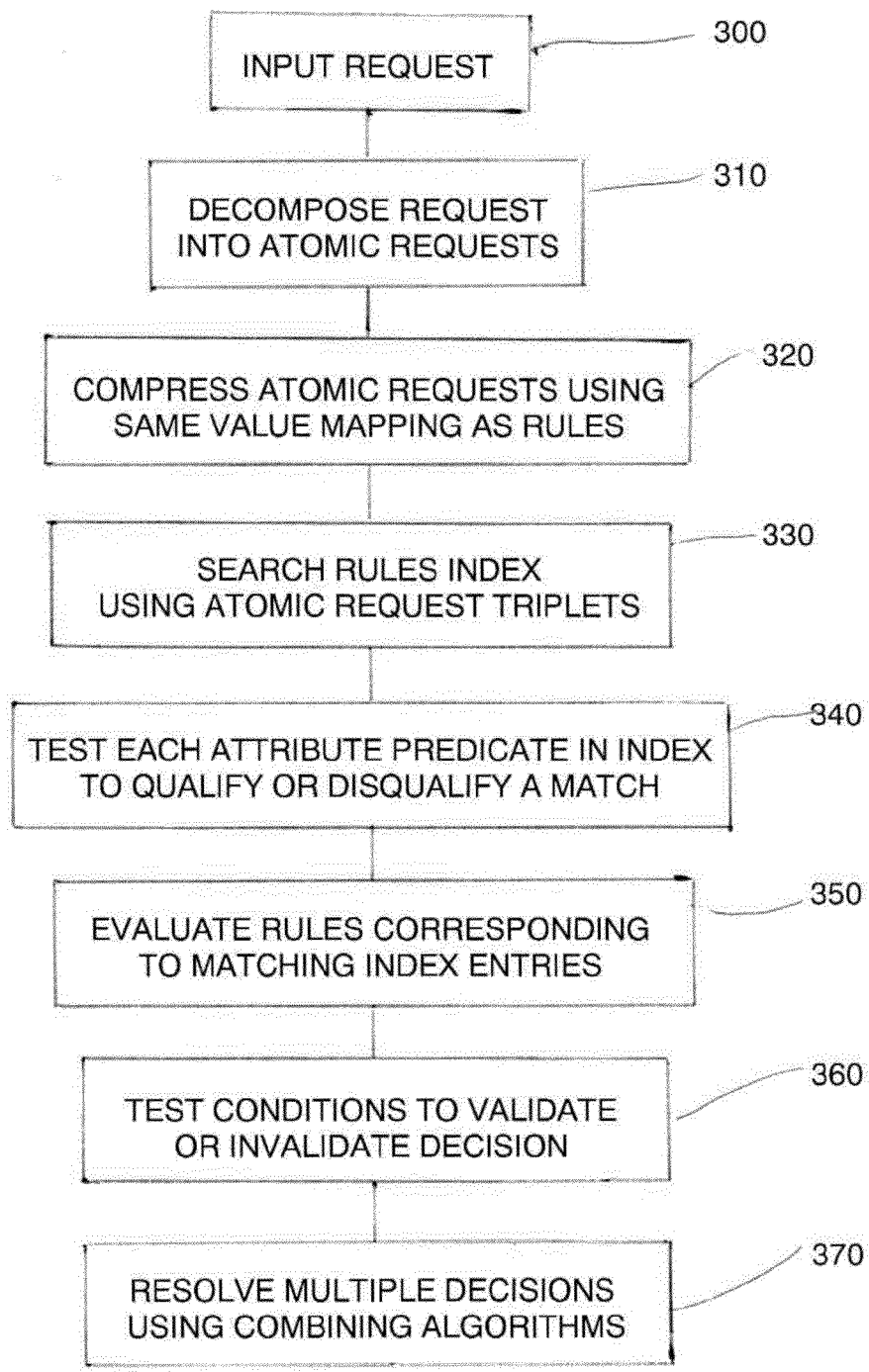
FIG. 3 illustrates a process in accordance with the invention for evaluating access requests against XACML access rules.

FIG. 3 is a flowchart of a preferred logical process in accordance with the invention for evaluating an XACML access request by a subject to perform a particular action on certain resources. An entitlement request may involve multiple subjects or multiple actions. An example of an access request may be: "Subject JSmith@xyz.com, who belongs to the Project_One group (an attribute of the subject) wishes to open the resource file: D:/Documents/Project_One Plan". If there is a policy and plain access rule: "Any user with an e-mail name within the namespace xyz.com is allowed to perform any action on the file: D:/Documents/Project_One Plan", evaluation of the request in accordance with this rule will result in a PERMIT decision allowing JSmith to open the file. As may be appreciated, there may be multiple policies and rules governing access to this file or to different parts of the file. For example, there may be another policy and rule: "Access to Project One financial documents is permitted only to users within the Project One management group". If subject JSmith is not a member of the Project One management group (an attribute predicate of the subject entity) and requests access to document: "D:/Documents/Project_One Plan/Financials.xls", the access request will be DENIED. This illustrates that access policies may be fine-grained and may involve multiple and varied conditions, and that access requests must be evaluated in accordance with all applicable access rules. A final access decision may be based upon the combined rule evaluation results, as will be described.

The access request evaluation process of FIG. 3 may be performed by the CPU 110 of the system 100 of FIG. 1 operating under the control of executable instructions embodied on computable readable media, such as being stored in memory 112, for instance. Referring to the figure, an input request may be received at 300 and decomposed into atomic requests at 310. An atomic request may comprise a triplet <s, a, r> meaning that subject, s, wishes to perform action, a, on resource, r, similar to the triplet previously described for an atomic rule. If a request requires functional processing by the system before it can be decomposed into atomic requests, such as in the case of a query request where the target resources are unknown before functional processing of the query, atomic requests may be generated on-the-fly when target resources are encountered during functional processing. At 320, an atomic request may be compressed by compressing each part of the triplet using the same value mapping as described above in connection with FIG. 2 for compressing atomic rules. At 330, the rules index may be searched using a key derived from the compressed atomic request triplet to look up applicable rules. For an atomic request triplet <s, a, r>, the keys for the index lookups may be computed from the set of triplets {s,ANY}×{a,ANY}×{r,ANY}. When a key is searched, a corresponding value can be located in the index to find an applicable rule. The compressed rule with the identical<id($s_1$),id($a_1$),id($r_1$)>triplet can be found from the value field, and the conditions and attribute predicates can be evaluated to determine whether a match exists. If a "lossy" compression algorithm is used to compress the triplet for an atomic rule or an atomic request, then each index lookup needs to be validated by comparing the uncompressed triplet of the atomic rule and that of the atomic request.

An atomic request matches the key of an index entry if the corresponding part of the triplet matches or if the corresponding part in the index entry contains the value "ANY", subject to further qualification by attribute predicates if any. Since there are two values to search for each part of the key (i.e., an explicit value provided by the atomic request and the value "ANY"), there are at most eight index-lookups needed for each atomic request. Accordingly, lookup may be performed quickly.

Continuing with the evaluation process of FIG. 3, at 340, for each potentially matching entry found in the index having an attribute predicate, the attribute predicate may be tested to qualify or disqualify the match, and the request may be evaluated at 350 against an atomic rule corresponding to the matching index entry to reach a decision. At 360, for each condition associated with the decision, the condition can be tested to validate or invalidate the decision. When the conditions and attribute predicates are satisfied, it can be concluded that the rule applies the request and that the decision specified by the rule can be drawn.

Where there is a set of policies governing access to a resource, evaluating a request against the multiple rules corresponding to the set of policies may result in multiple decisions that conflict. The multiple decisions may be resolved, as indicated at 370, by using rule-combining algorithms (logical processes) to reach a final decision. The OASIS XACML standard referenced above gives examples of rule-combining algorithms which may be employed for resolving multiple decisions. An example of one such algorithm is "DENY overrides PERMIT". If any rule evaluates to DENY, then the final authorization decision is also DENY regardless of whether other rules evaluate to PERMIT", as was illustrated in the above example of JSmith.

In order to support access control to hierarchical resources, the resource to which an access request is directed may be at an intermediate node of a hierarchical structure. In this event, the evaluation process can be employed to first determine whether a subject requesting access to the intermediate level resource is permitted to access the resources at levels above the intermediate level in order to get the final decision. If the subject is not permitted access to resources at higher levels in the hierarchy, a rule may deny access to lower level resources.

From the foregoing description, it may be appreciated that an access control system and method in accordance with the invention affords numerous advantages. Importantly, an access control system and method in accordance with the invention is based upon XACML policies and rules which offer broad capabilities and extensibility to cover numerous fine-grained, complex and multi-conditional access policies which are capable of dynamically changing. It is well-known that XACML policies may be used to support traditional access control policies such as Access Control Lists (ACL) or Role-Based Access Control (RBAC) policies. This makes the invention particularly applicable to information systems of large enterprises which may have numerous users, numerous resources to manage and numerous complex and varied security policies that control access to resources. Advantageously, the invention affords high efficiency in evaluating a large number of rules or policies controlling access to a large number of resources, because the rule evaluation process merely requires a small number of index lookups which may be performed very quickly to locate applicable rules. Being in atomic form, the applicable rules can be indexed and quickly evaluated to produce an authoritative access decision relative to the requested resource. Moreover, a system and method in accordance with the invention enables rules and policies to be easily changed and extended to delete access policies or to incrementally incorporate new or modified policies. Significantly, policies may be updated on-the-fly, and the update operations do not affect the request evaluation process. A system and method in accordance with the invention provides an access control facility that can readily support ACL, RBAC, and hierarchical policies, making it applicable to different types of access control policies.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method of controlling access to a resource, comprising:
    extracting by an extracting computer one or more atomic rules from an access control policy defining access to a resource, each said atomic rule being characterized by a triplet of entities comprising a subject entity having a single subject value, an action entity having a single action value, and a resource entity having a single resource value, and being characterized by a decision value;
    losslessly compressing each entity value of said triplet and said decision value into corresponding numeric values;

indexing by an indexing computer in an index said atomic rule using an index value for said atomic rule formed by concatenating the corresponding numeric values of the entities of said triplet;

decomposing by a receiving computer a request for access to a resource into one or more atomic requests, each atomic request comprising a request triplet having an identified subject, an identified action, and an identified resource;

deriving by the receiving computer an index key for each atomic request by converting the parts of the request triplet into other corresponding numeric values and concatenating said other corresponding numeric values;

searching said index using said index key to locate applicable atomic rules; and evaluating said atomic request relative to said applicable atomic rules to provide an access decision.

2. The method of claim 1, wherein said extracting comprises extracting a plain rule from said access control policy, said plain rule and said access control policy being XACML based, and transforming said plain rule into said one or more atomic rules.

3. The method of claim 1, wherein each of said entities has an attribute identifier and an attribute value, and said indexing comprises entering into said index associated with said key the attribute value for each of said entities and said decision value.

4. The method of claim 1, wherein said compressing comprises compressing atomic rules which have identical rule triplets into a single index entry prior to said indexing, and said indexing comprises entering said single index entry into said index associated with a count indicating the number of atomic rules that map to said entry.

5. The method of claim 4, wherein each of said atomic rules has one or more associated conditions and one or more attribute predicates, and said compressing comprises converting the associated conditions and the attribute predicates into compressed values, and said indexing comprises entering said compressed values into said index associated with single index entry.

6. The method of claim 5, wherein said compressed values comprise numerical values, and said converting comprises converting the associated conditions and the attribute predicates into said numerical values using a hash.

7. The method of claim 1, wherein said index resides in memory of an access control computer and references atomic rules stored in a database.

8. The method of claim 1, wherein each entity of said one or more atomic requests has an attribute value, and said deriving said index key comprises converting the attribute value of an atomic rule into a key value using a conversion operation corresponding to one used for indexing said one or more atomic rules.

9. The method of claim 1 further comprising testing an attribute predicate of an applicable rule located in said searching said index using an index key relative to an attribute value of an atomic request to qualify or disqualify the applicable rule as a match to the atomic request.

10. The method of claim 9, wherein said evaluating comprises testing a condition of the applicable rule relative to said atomic request to validate or invalidate an access decision.

11. The method of claim 1 further comprising resolving multiple access decisions produced by different applicable rules using predetermined combining algorithms.

12. A computer readable storage device comprising executable instructions for controlling the operation of a computer to control access to a resource, comprising instructions for:

extracting one or more atomic rules from an access control policy defining access to a resource, each said atomic rule being characterized by a triplet of entities comprising a subject entity having a single subject value, an action entity having a single action value, and a resource entity having a single resource value, and being characterized by a decision value;

losslessly compressing each entity value of said triplet and said decision value into corresponding numeric values;

indexing in an index said atomic rule using an index value for said atomic rule formed by concatenating the corresponding numeric values of the entities of said triplet;

decomposing a request for access to a resource into one or more atomic requests, each atomic request comprising a request triplet having an identified subject, an identified action, and an identified resource;

deriving an index key for each atomic request by converting the parts of the request triplet into other corresponding numeric values and concatenating said other corresponding numeric values;

searching said index using said index key to locate applicable atomic rules; and evaluating said atomic request relative to said applicable atomic rules to provide an access decision.

13. The computer readable storage device of claim 12, wherein each of said entities has an attribute identifier and an attribute value, and said indexing comprises entering into said index associated with said key the attribute value for each of said entities and said decision value.

14. The computer readable storage device of claim 12, wherein said compressing comprises compressing atomic rules which have identical rule triplets into a single index entry prior to said indexing, and said indexing comprises entering said single index entry into said index associated with a count indicating the number of atomic rules that map to said entry.

15. The computer readable storage device of claim 12, wherein each of said atomic rules has one or more associated conditions and one or more attribute predicates, and said instructions for compressing comprise instructions for converting the associated conditions and the attribute predicates into compressed values, and said instructions for indexing comprise instructions for entering said compressed values into said index associated with said single index entry.

16. The computer readable storage device of claim 15, wherein said compressed values comprise numerical values, and said instructions for converting comprise instructions for converting said associated conditions and the attribute predicates into said numerical values using a hash.

17. The computer readable storage device of claim 12, wherein each entity of said one or more atomic requests has an attribute value, and said instructions further comprise instructions for deriving said index key comprising instructions for converting the attribute value of an atomic rule into a key value using a conversion operation corresponding to one used for indexing said one or more atomic rules.

18. The computer readable storage device of claim 12 further comprising instructions for testing an attribute predicate of an applicable rule located in said searching said index using an index key relative to an attribute value of an atomic request to qualify or disqualify the applicable rule as a match to the atomic request.

19. The computer readable storage device of claim 18, wherein said instructions for evaluating comprise instructions for testing a condition of an applicable rule relative to said atomic request to validate or invalidate a decision.

20. The computer readable storage device of claim 12 further comprising instructions for resolving multiple access decisions produced by different applicable rules using predetermined combining algorithms to reach an authoritative access decision.

* * * * *